Jan. 18, 1927.
R. FRANCART
1,614,981
APPARATUS FOR REGULATING THE SPEED OF CONTINUOUS FIRING OF AUTOMATIC WEAPONS
Filed May 29, 1925
3 Sheets-Sheet 1
Fig. 1
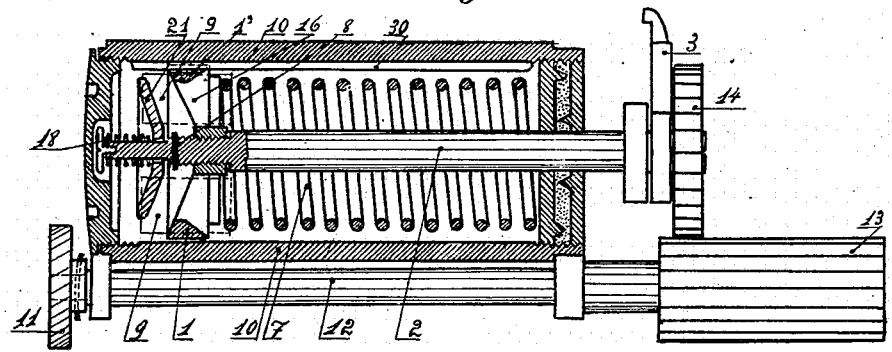
Fig. 2
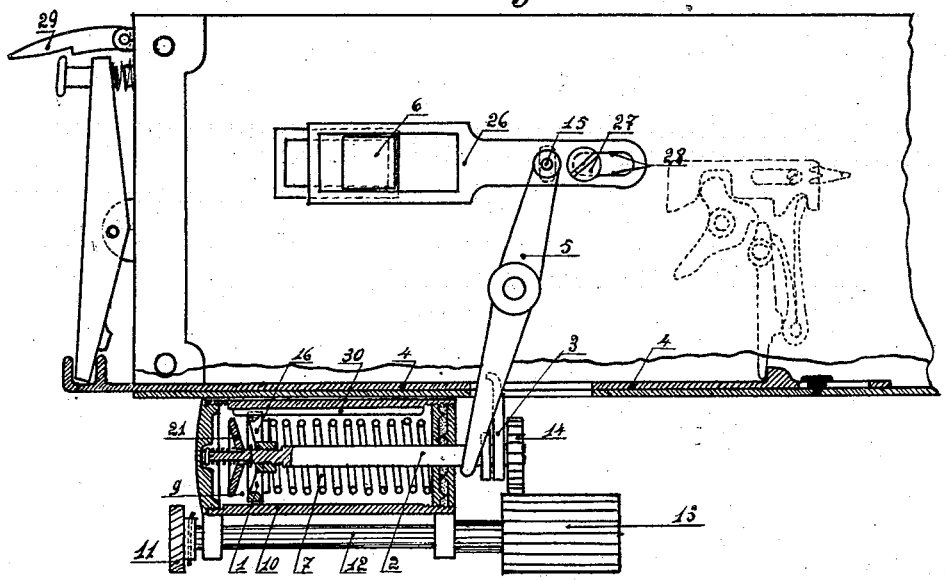
Fig. 3 . 3 bis
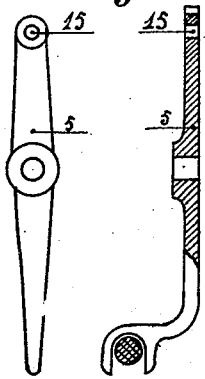
Inventor,
Remy Francart,
By
atty.

Jan. 18, 1927. 1,614,981
R. FRANCART
APPARATUS FOR REGULATING THE SPEED OF CONTINUOUS FIRING OF AUTOMATIC WEAPONS
Filed May 29, 1925 3 Sheets-Sheet 2

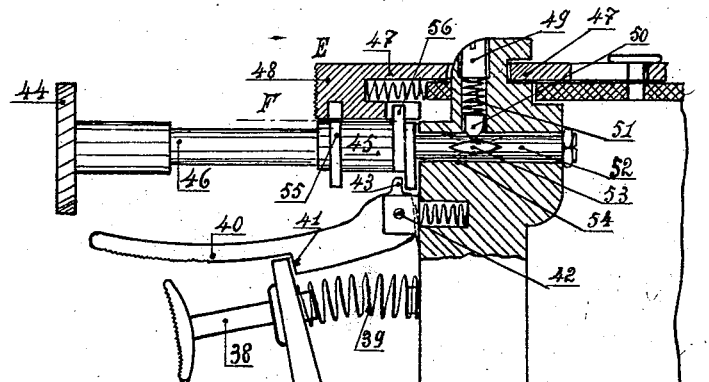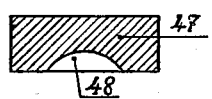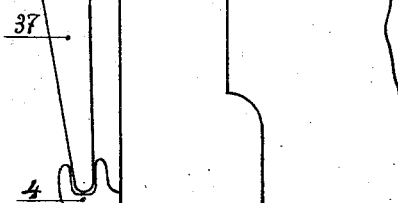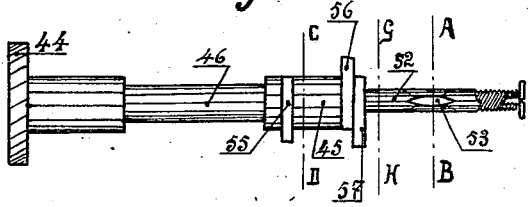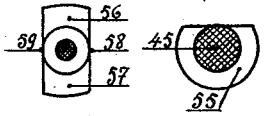

Patented Jan. 18, 1927.

1,614,981

UNITED STATES PATENT OFFICE.

REMY FRANCART, OF BRUSSELS, BELGIUM, ASSIGNOR TO SOCIÉTÉ ANONYME: ETABLISSEMENTS BRAEKERS, OF HERSTAL-LEZ-LIEGE, BELGIUM.

APPARATUS FOR REGULATING THE SPEED OF CONTINUOUS FIRING OF AUTOMATIC WEAPONS.

Application filed May 29, 1925, Serial No. 33,733, and in Belgium June 21, 1924.

The present invention relates to automatic arms and has for its object to regulate at will the speed of firing.

The possibility of being able to regulate at will the speed of firing permits, amongst other things, of avoiding over-heating the gun whilst preserving the necessary accuracy, particularly in indirect shooting.

At present, these arms operate by recoil or by gas deduction, and it is the tension of the return spring, actuating the mechanism, which fixes the amount of the motive effort without it being possible to regulate efficiently the speed of firing.

The speed regulating apparatus comprises a piston valve, arranged in such a way that at the moment of recoil its displacement is produced almost instantaneously whilst the return is effected at variable and regulable speeds according to the speed of firing desired. This regulation may be effected previously or even during firing, by the simple operation of a wheel, disposed near the operator's hand, thus permitting him to give a determined speed to the automatic firing.

Applied to a Maxim or any other machine gun, the device effects independence of the operation of ordinary rapid fire and permits of utilizing this latter at any moment whatever of retarded firing, without modifying the regulation of the same, thereby rendering possible the immediate change over from retarded firing to rapid firing and inversely.

My invention relates also to a modified construction of the upper end of the part carrying the operating nose which acts upon the trigger release; according to this modification, said nose is made to come under the trigger release after having fulfilled its action so that it is necessary either after a misfire or for firing the first cartridge to operate directly by hand the knob of the safety lever which acts upon the trigger release in order to fire the next shot.

My invention further relates to a locking device for locking or unlocking the safety lever and the cover, comprising a stem provided with a knob which in operation gives four definite positions, of which two being symmetrical three are consequently different.

1.—Position in which the opening of the body and the safety lever are locked in such a manner that the operation of the trigger lever which in its turn operates the trigger release, that is to say the firing " shot after shot " may take place.

2.—Position in which the opening of the body cover and the complete locking of the safety lever take place allowing the lever which operates the trigger release to act freely, that is to say, permitting the automatic firing with or without regulation of the firing speed.

3.—Position in which the opening of the body cover is unlocked (allowing the opening of the firearm) and the safety lever is locked, so that the latter locks the trigger release thus preventing the operation of the machine gun when the cover is taken off.

The accompanying drawings illustrate by way of example one form of the apparatus, wherein:—

Fig. 1 is a longitudinal section partly in elevation of the speed regulating apparatus.

Fig. 2 shows the application of the regulating apparatus to a Maxim gun.

Figs. 3 and 3$^b$ are respectively a front view and section of the connecting lever between the regulating apparatus and the gun.

Figure 4:
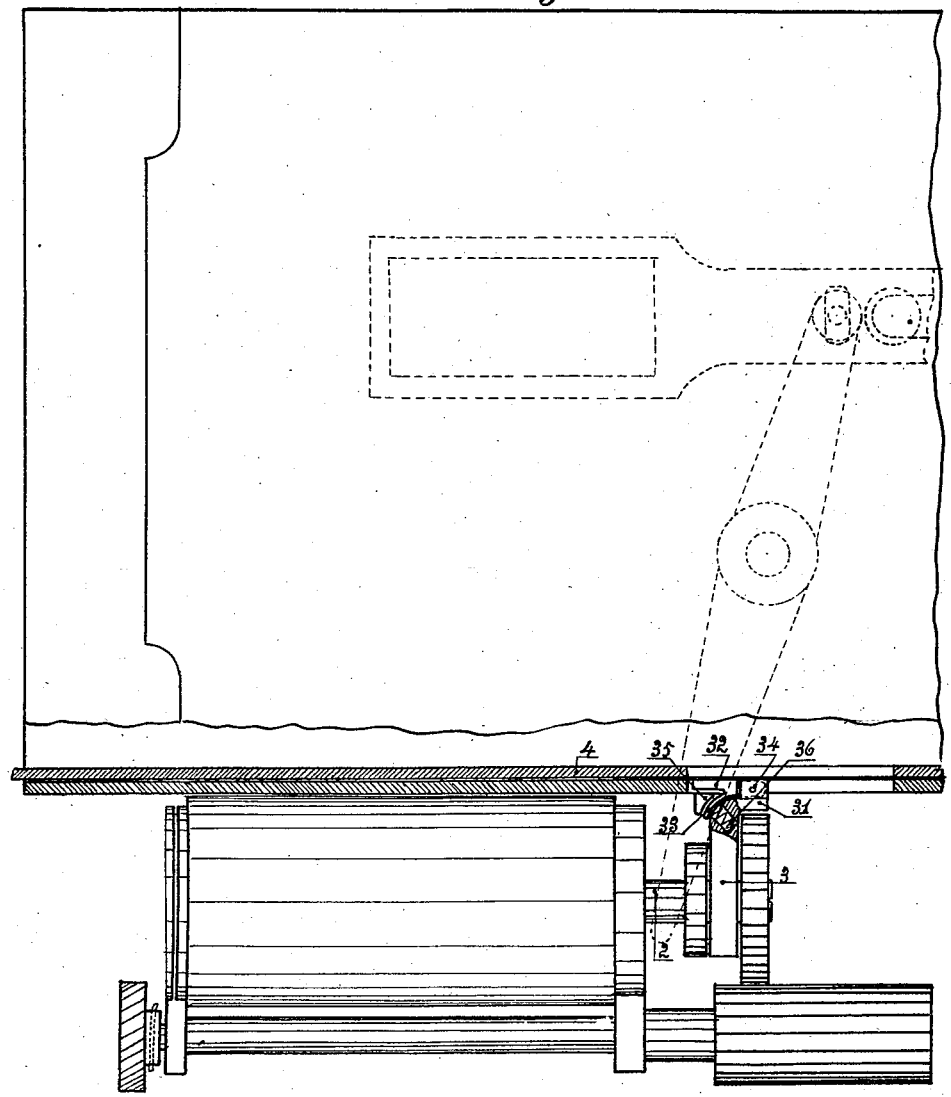

Fig. 4 is a diagram showing the back portion of a machine gun provided with the device for regulating the speed of the continuous firing of automatic weapons and comprising the modification of the nose operating the trigger release.

Figure 5:
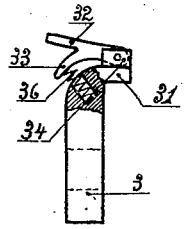

Fig. 5 is a side elevation showing separately the part for operating the trigger release.

Figure 6:
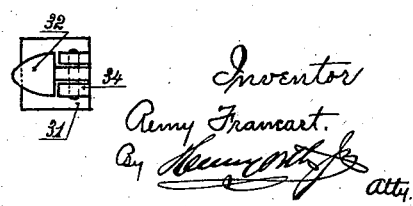

Fig. 6 is a plan view of the extremity of the nose shown in Fig. 5.

Fig. 7 is a part sectional view of the back portion of a Maxim gun provided with the locking latch above mentioned.

Fig. 8 is a sectional view on line E—F, Fig. 7.

Fig. 9 is a longitudinal view of the locking rod and Figs. 10, 11 and 12 are sectional views of same respectively on lines A—B, C—D, and G—H, Fig. 9.

Referring to the above drawings, the apparatus for regulating the speed of firing comprises a piston 1, having passages 16, forming the seating for a valve 21. The stem 2 of the piston 1 carries at its forward extremity a nose 3 which acts at the end of the return of the piston on the trigger release 4.

The valve 21, when displaced on the stem 2 leaves a large aperture for the passage of the liquid which permits the piston valve 1—21 to be displaced instantaneously by the effect of the recoil transmitted to the piston stem 2 by a lever 5 moved for example by one of the mobile cheeks of the machine gun.

For this purpose the extremity of the lever 5 is pivoted at 15 to a slide bar 26 in an indentation of which the cleat 6 of the breech engages. The slide bar 26 is itself guided by a screw 27 in a fixed part of the machine gun engaging a guide slot 28 of the slide bar. The other extremity of the lever 5 ends in a fork riding on the piston stem 2 (see Fig. 3).

During this travel, the liquid, oil for example, passes from one face to the other of the piston by passages 16 and the return spring 7 of this piston is compressed to ensure its return travel.

This travel is effected at first at diminished and regulable speed according to the space left between the piston 1 and the abutment 8 of the valve, then at an accelerated speed in order to have the requisite force necessary for throwing the trigger out of gear by tension on the release 4. This speed at the end of travel is obtained by enlargements 9 arranged in the wall of the cylinder 10 in a way to permit the rapid passage of the liquid from one face to the other of the piston, at chosen moments.

This arrangement permits not only the throwing out of gear of the tumbler, but likewise the easy starting of the piston 1 at the moment of recoil, which is instantaneous and violent, but permits, moreover, after an interruption, the immediate renewal of automatic firing by simply raising the safety pawl 29.

The regulation of the speed which may be operated even during the firing is obtained by the operation of a knob 11 fixed to an axle 12 parallel to the stem of the piston. This axle carries at its front extremity a long pinion 13 integral therewith, which controls a gear 14 fixed on the piston stem.

The piston 1 is provided with a slot 1ª to receive a guide rib 30 disposed inside the cylinder 10 to prevent the piston 1 from turning in its casing 10 when the stem 2 is operated. The reverse, namely a projection of the piston engaging in a groove inside the cylinder, can give the same result, and this solution moreover is preferable to the guiding of the spring such as 7.

The piston is screwed on its stem in such a way that the rotation of the latter causes displacement of the piston 1 in relation to the projection 8 of the valve.

The valve is returned against its projection 8 by a light spring 18 which permits the valve to be displaced from the piston during the travel caused by the recoil in a way to leave at that moment a large area of passage for the oil and to avoid increasing the passive resistance which might absorb to a certain extent the force of the recoil.

It is to be observed that the whole of this arrangement preserves for the machine gun independence of operation permitting the old rapid firing at any moment, during the time desired, without putting the apparatus out of order, thus permitting at will a renewal of the continuous automatic firing at the determined speed.

It is likewise obvious that it is possible to render the machine gun dependent on the regulating apparatus.

In the modified construction shown in Figs. 4, 5 and 6, the nose 3 is provided with a curved portion 31 on which is pivoted by means of a pin 34 a part having a pair of arms 32 and 33. The arm 33 is pushed upwards by a spring 36 housed in a recess provided in the upper part of the nose 3, and the arm 32 is designed to engage the trigger release 4. Upon the casing containing the regulating mechanism is fixed an element 35 having an appropriate profile so that when the back of arm 32 is turned towards it on the return stroke, said arm bends down sliding on the lower face of abutment 35 thus causing the arm 32 to descend and to take the position indicated in Fig. 4. It will be understood that when the stem 2 moves forward at the moment a new shot has been fired the whole of the device 32, 33 is disengaged and is moved upwards owing to the tension of spring 36, Fig. 5, and that from that instant the automatic firing can be again restored with regulation of the speed of firing or not.

It is necessary when said device is used that the trigger release should be actuated by the operating knob to determine the firing of the first shot when for any cause the gun has stopped firing.

The locking device shown in Figs. 7, 8, 9, 10, 11 and 12 comprises a stem 52 frictionally engaged in a bore corresponding to the back part 54 of the weapon where it is retained by means of a nut. The exterior part 45 of this stem 52 is composed of three eccentric elements or cams 55, 56, 57, the object of which will be hereinafter more clearly explained; the square part 46 which follows may bear upon its straight sides indications regarding the shooting condition of the weapon; lastly a small wheel or an operating knob 44 is provided at the end of said stem. In order to determine exactly the four locking positions, the stem 52 is provided at 90° with indentations 53 in which may engage a retaining pin 50 acted upon by a spring 51 fixed by means of a screw 49 housed in an appropriate bore in the upper end of the bottom part 54, Figs. 7, 9 and 10.

The latch of the cover 47 of the gun body is provided at its lower end with an appropriate recess 48 for the cam disc 55 according to the position determined by the rotation of the small wheel 44.

The locking stem 52 takes part in the operation of a safety lever 40 pivoted at 42. This safety lever has a nose or projection 43, for engagement by the cams 56, 57, as hereinafter described and is also provided with a locking lug 41 to engage the upper end of the lever 37. The lower end of the latter controls the trigger release 4 and is provided at its upper end with a push button 38 and a return spring 39.

In the position shown in Fig. 7, the locking stem 52 is placed in a position to allow the lifting of the cover 47, its latch being disengaged opposite the flat surface of the cam 55 which is diametrically opposite the locking cam 57 of the safety lever 40 thus making shooting impossible.

In this position, the cam 57 locks the nose 43 of the safety lever 40 with the result that the trigger lever 37 which operates the trigger release 4 is caused to remain stationary by the lug 41.

It will be understood that when the knob 44 and consequently the locking stem are rotated 90° to the right or to the left, the flat part 58 or 59 of the discs 56 and 57 will disengage the nose 43 of the safety lever 40 which may then be raised by hand for shooting. When the locking stem is further rotated 90° more in the same direction, the safety lever remaining raised, the latter is locked in said position by the cam 56 engaging the nose 43 so that the machine gun left to itself will produce an integrally automatic continuous firing at any speed fixed by the regulating device.

In the positions of firing above indicated the cam 55 locks at 48 the latch of the cover 47 so as to render its opening impossible during firing.

The great value of the above described device is obvious, it may comprise modifications or appropriate constructional variations differing from those represented in the annexed drawings according to its application to the type of machine gun to which it is applied without departing from the limits of the invention.

What I claim and desire to secure by Letters Patent of the United States is:—

1. In a device for regulating the speed of continuous firing of automatic weapons, a cylinder adapted to contain a liquid, a piston rod movable in said cylinder, a piston mounted upon said rod and having an aperture, a valve mounted on said rod and controlling flow of liquid through said aperture, means adjusting the position of the piston on the rod in relation to the valve, means controlling the movement of the piston rod in either direction, mechanism on said rod to operate the trigger release of the weapon, and means permitting automatic continuous firing at the desired speed and simultaneously locking the cover of the weapon.

2. An apparatus for regulating the speed of continuous firing of automatic weapons comprising a cylinder or casing for the liquid, enlargements of the internal diameter formed by recesses provided in the cylinder wall in front and near the end of the return stroke of the piston; a piston rod movable in said cylinder, a piston mounted upon said rod and having an aperture, a valve mounted upon said rod and controlling movement of liquid through said aperture, means adjusting the position of the piston on the rod in relation to the valve, means for controlling the travel of the piston valve in both directions, means upon said piston rod to operate the trigger of the weapon, and external means to cause the distance to vary between the movable valve and piston.

3. An apparatus for regulating the speed of continuous firing of automatic weapons comprising a cylinder or casing for the liquid, an apertured piston constituting a valve seat travelling also in said cylinder adjustably secured on the piston stem, a disk valve slidable upon said piston stem, a fixed abutment upon the stem between the disk valve and the piston and an elastic abutment integral with the stem upon the other side of the disk valve, means to control the movement of the piston valve in both directions, means upon said piston stem to operate the trigger of the weapon and exterior means to cause the distance to vary between the movable disk valve and piston.

4. An apparatus for regulating the speed of continuous firing of automatic weapons comprising a cylinder or casing for the liquid, a piston rod movable in said cylinder, a piston mounted upon said rod and having an aperture, a valve mounted upon said rod and controlling movement of liquid through said aperture, means adjusting the position of the piston on the rod in relation to the valve, an abutment upon the exterior of the piston stem, an articulated fork lever engaging said abutment, a slide bar in parallel with the piston stem and integral with the head of the lever, an opening provided in the slide bar and a boss formed upon the cheek of the gun which may be moved by the recoil to draw the said slide bar in its movement, a spring arranged in the cylinder so as to be compressed during the forward stroke of the piston in order to operate its return stroke, means upon said piston rod to control the trigger of the weapon and external means to cause the distance to vary between the movable valve and piston.

5. An apparatus for regulating the speed of continuous firing of automatic weapons comprising a cylinder or casing for the liquid, a piston rod movable in said cylinder, a piston mounted upon said rod and having an aperture, a valve mounted upon said rod and controlling movement of liquid through said aperture, means adjusting the position of the piston on the rod in relation to the valve, means controlling the piston valve in both directions; a nose integral with the external portion of the piston stem in order to act upon the trigger release at the end of the piston stroke, means to cause the lowering of said nose after its operation, means to then operate its rising during the reverse stroke, and external means to cause the distance to vary between the movable valve and piston.

6. An apparatus for regulating the speed of continuous firing of automatic weapons comprising a cylinder or casing for the liquid, a piston rod movable in said cylinder, a piston mounted upon said rod and having an aperture, a valve mounted upon said rod and controlling movement of liquid through said aperture, means adjusting the position of the piston on the rod in relation to the valve, means for controlling the displacement of the piston in both directions, a nose integral with the exterior portion of the piston stem and designed to act on the return stroke upon the trigger release, a head pivoted upon the extremity of said nose and constituted by two formed arms of which the upper arm is situated in the trajectory of the trigger release, a stationary abutment integral with the machine gun placed in the trajectory of the lower arm of the pivoted head and formed so as to cause the inclination of said head until the upper arm disappears under the trigger release after its action upon same; a spring placed under the lower arm and arranged in the body of the nose to effect the rising of the pivoted head during the opposite or forward stroke, and external means to cause the distance to vary between the movable valve and apertured piston.

7. An apparatus for regulating the speed of continuous firing of automatic weapons comprising a cylinder or casing for the liquid, a piston rod movable in said cylinder, a piston mounted upon said rod and having an aperture, a valve mounted upon said rod and controlling movement of liquid through said aperture, means adjusting the position of the piston on the rod in relation to the valve; means controlling the displacement of the piston valve in both directions, means upon said piston rod to operate the trigger release of the machine gun; an axis in parallel with the piston stem carried by the exterior cheeks of the cylinder covers, a knob controlling the rotation of said axis means to transmit the rotation of said axis to the stem of the piston valve itself during the working and means to prevent the rotation of the piston proper which is screwed upon its stem.

8. An apparatus for regulating the speed of continuous firing of automatic weapons comprising a cylinder or casing for the liquid, a piston rod movable in said cylinder, a piston mounted upon said rod and having an aperture, a valve mounted upon said rod and controlling movement of liquid through said aperture, means adjusting the position of the piston on the rod in relation to the valve; means to control the displacement of the piston valve in both directions, means upon said piston rod to operate the trigger release of the machine gun, an axle arranged in the external cheeks of the cylinder covers in parallel with the piston stem, a knob controlling the rotation of said axle, an indented sleeve having a length equal to that of the piston stroke keyed upon the piston stem and engaging said sleeve and a groove formed in the piston guided on a side bar integral with the cylinder.

9. A locking device constituted by the cover of the body of a machine gun and the safety lever permitting at will the firing shot after shot, automatic firing and the complete stopping of the firing, which comprises a rotary axis mounted in the body of the gun, means integral with said axis to execute combinations of locking of the body cover and of the safety lever controlling the operation of the trigger mechanism, and means for locking the trigger release in all its characteristic positions.

10. A locking device constituted by the cover of the body of a machine gun and the safety lever permitting at will the firing shot after shot, automatic firing and the complete stopping of the firing, comprising a rotary axis arranged in the body of the gun and operated by hand, a cam mounted upon said axis having the shape of a ring with a flat portion at the point of contact with the axis, a groove formed in the body cover opposite to said cam, means for locking or unlocking the trigger mechanism by means of the safety lever and means to ensure the locking of the rotary axis in all its characteristic positions.

11. A locking device constituted by the cover of the body of a machine gun and the safety lever permitting at will the firing shot after shot, automatic firing and the complete stopping of the firing, comprising a rotary axis arranged in the body, a cam mounted upon said axis in line with a groove formed in the body, two cams with parallel sides mounted side by side upon said axis, the front one being on one side of the axis and the other one on the diametrically opposite side and opposite to the flat portion of the first cam, a nose formed upon the safety lever of the machine gun and capable of following the oscillations of the latter and the rotary movements of the axis in order to come to lie behind the first cam and under the second, or in front of the second cam and under the first or again to be disengaged from both cams when the latter occupy an horizontal position, and means to lock the axis in its different characteristic positions.

12. A locking device constituted by the cover of the body of a machine gun and the safety lever permitting at will the firing shot after shot, automatic firing, and complete stopping of the firing, comprising a rotary axis arranged in the gun body, cams integral with said axis in order to produce combined locking of the body cover and of the safety lever controlling the operation of the trigger mechanism; four indentations provided upon the axis according to directions at 90°; a push button in line with said indentations and a spring arranged in a bore of the gun body and acting upon said push button.

In testimony that I claim the foregoing as my invention, I have signed my name.

REMY FRANCART.